US011140461B2

(12) United States Patent
Grant et al.

(10) Patent No.: US 11,140,461 B2
(45) Date of Patent: Oct. 5, 2021

(54) VIDEO THUMBNAIL IN ELECTRONIC PROGRAM GUIDE

(71) Applicant: Sony interactive Entertainment LLC, San Mateo, CA (US)

(72) Inventors: Daniel Grant, London (GB); Steven Edward Silvas, San Jose, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/638,293

(22) Filed: Jun. 29, 2017

(65) Prior Publication Data

US 2018/0007450 A1      Jan. 4, 2018

Related U.S. Application Data

(60) Provisional application No. 62/356,324, filed on Jun. 29, 2016.

(51) Int. Cl.
*H04N 21/84* (2011.01)
*H04N 21/482* (2011.01)
*H04N 21/431* (2011.01)
*H04N 21/235* (2011.01)

(52) U.S. Cl.
CPC .......... *H04N 21/84* (2013.01); *H04N 21/235* (2013.01); *H04N 21/431* (2013.01); *H04N 21/482* (2013.01)

(58) Field of Classification Search
CPC .... H04N 21/84; H04N 21/482; H04N 21/431; H04N 21/235
See application file for complete search history.

(56) References Cited

U.S. PATENT DOCUMENTS

| 5,583,560 A * | 12/1996 | Florin | G09B 5/14 348/E7.054 |
| 8,522,281 B1 * | 8/2013 | Sahami | H04N 21/4622 725/48 |
| 9,800,828 B1 * | 10/2017 | Rothschild | H04N 7/0806 |
| 2002/0174430 A1 * | 11/2002 | Ellis | G11B 27/005 725/46 |
| 2005/0193337 A1 * | 9/2005 | Noguchi | G06F 17/214 715/269 |
| 2007/0050813 A1 * | 3/2007 | Lee | H04N 5/44543 725/40 |

(Continued)

*Primary Examiner* — Justin E Shepard
(74) *Attorney, Agent, or Firm* — Polsinelli LLP

(57) ABSTRACT

The present disclosure describes methods and systems directed at implementing a video thumbnail that facilitates user viewing of video content alongside additional content such as an electronic program guide. The video thumbnail would display the video content that was currently playing when the user requests access to the electronic program guide. The video thumbnail would be situated in a predefined portion of the display such that the information within the electronic program guide is not obscured. Furthermore, additional information (e.g. metadata) associated with the video thumbnail can be provided that provides information to the user about what is currently being displayed in the video thumbnail. Lastly, the user is able to perform actions with the electronic program guide without losing the video thumbnail so that the user is able to view the video content while the electronic program guide is displayed.

20 Claims, 8 Drawing Sheets

(56) References Cited

U.S. PATENT DOCUMENTS

| | | | |
|---|---|---|---|
| 2007/0192791 A1* | 8/2007 | Sullivan | H04N 5/50 725/38 |
| 2008/0127258 A1* | 5/2008 | Walker | H04N 7/163 725/39 |
| 2009/0259943 A1* | 10/2009 | Barsook | H04N 5/44513 715/730 |
| 2010/0306800 A1* | 12/2010 | Jung | H04N 1/00448 725/41 |
| 2013/0347037 A1* | 12/2013 | Soroushian | H04N 21/26258 725/39 |
| 2014/0053197 A1* | 2/2014 | Shoykher | H04N 21/422 725/41 |
| 2014/0229988 A1* | 8/2014 | Alexander | H04N 5/44543 725/42 |
| 2015/0067736 A1* | 3/2015 | Whitten | H04N 21/458 725/46 |
| 2015/0201241 A1* | 7/2015 | Schein | G06F 3/0481 725/41 |
| 2015/0373411 A1* | 12/2015 | Jeong | H04N 21/4622 725/49 |
| 2016/0073154 A1* | 3/2016 | Ellis | H04N 5/44543 725/41 |
| 2016/0134910 A1* | 5/2016 | Davis | H04N 5/76 725/27 |
| 2016/0342319 A1* | 11/2016 | Wang | G06F 3/04847 |
| 2017/0289631 A1* | 10/2017 | Lee | H04N 21/43 |

\* cited by examiner

TV GUIDE

| | | | 11/7 10:05 AM |
|---|---|---|---|
| Mon 11/7 | 8:00 PM | 8:30 PM | 9:00 PM |
| 9 KRIV | ◁ Prison Break ⓝ | | Fox 26 News at 9 ▷ |
| 12 KPRC | ◁ Las Vegas | | Medium ⓘ ▷ |
| 1031 KBTXDT | ◁ Two and a Half Men Ⓐ | Out of Practice [HD] | CSI: Miami [HD] ▷ |
| 1081 KUHTDT | ◁ American Experience | | ▷ |
| 1082 KUHTDT2 | ◁ Masterpiece Theatre (2/2) | | Everglades, a Naked Planet Spe... ▷ |

Two and a Half Men (HD): Mon 11/7 8:00 PM - 8:31 PM
"Sleep Tight, Puddin' Pop" - (New) - Rose's father (Martin Sheen) confronts Charlie about his intentions towards his daughter. Starring Charlie Sheen, Jon Cryer, Angus T. Jones, Marin Hinkle, Holland Taylor Figure 1B
(prior art)

VIDEO THUMBNAIL IN ELECTRONIC PROGRAM GUIDE

CROSS-REFERENCE TO RELATED APPLICATIONS

This application claims the priority benefit of U.S. provisional patent application 62/356,324 filed Jun. 29, 2016, the disclosure of which is incorporated herein by reference.

BACKGROUND

Field of Invention

The present invention generally relates to electronic programming guides. More specifically, the present invention relates to the use of video thumbnails in connection with an electronic program guide.

Description of the Related Art

There have been many different attempts that have tried to provide informational content (e.g. program guides) on a display associated with a user device (e.g. laptop, desktop, mobile device, console) for a user to view while the user is currently viewing content on the same display. For example, if the user is currently viewing video content (e.g. live episode of a television series, sports event) displayed on a user device but would like to view what other content may be available for viewing via a program guide, many times the program guide will be displayed for the user in a way that obscures the view of the video content that was being viewed. This may be an issue for live video content where the video information is provided in real time to the user to view on the user device as the user may not wish to miss what is currently being shown.

FIG. 1A and FIG. 1B illustrate user displays according to a first prior art method. FIG. 1A illustrates a display where a user is viewing video content on the user device. FIG. 1B illustrates the display where the user is viewing a program guide that has been displayed in a manner that completely obscures the currently playing video content. Some embodiments may still have the video content play in the background while the user is viewing the program guide. In doing so, the user is still able to hear music or voices associated with the still playing video content. However, the user is unable to view any of the video content while the program guide is visible thereby creating situations where the user may miss out on events occurring within the video content.

FIG. 2 illustrates the display where the program guide has been provided in a manner that overlays the currently viewed video content. The user is able to see aspects of the video content in the background while perusing the program guide that is displayed in a contrasted manner in the foreground. Since display of both the program guide and the video content is being performed simultaneously within the same field, the information being displayed in both the program guide and the video content may be unclear. For example, text-based information in the program guide displayed in the foreground may be unreadable, obscured, and lost when combined with the events occurring within the video content playing in the background. Furthermore, the video content may also be similarly obscured by the program guide such that the user may miss details of events occurring within the video content.

FIG. 3A and FIG. 3B illustrate user displays according to a third prior art method. FIG. 3A illustrates the display where both the program guide and the video content are displayed simultaneously. In particular, the video content is allocated a portion of the display overlaying the program guide. Portions of the program guide may be obscured from view.

Furthermore, current program guides may not allow the user to perform all activities associated with the program guide without obscuring the display of the video content. In particular, FIG. 3B illustrates that some activities (e.g. performing a text-based search) associated with the program guide will still obscure even the allocated portion of the video content as illustrated in FIG. 3A. In this situation, a different interface is provided that does not include the video content for the user to view. In other words, the user may be allowed to view the video content while performing some actions with the program guide but view of the video content may be obscured while the user is performing other actions.

There is a need for a process whereby video content is displayed for the user to view simultaneously while viewing alternative content (e.g. the program guide). Furthermore, the video content would still be available as the user is performing various actions associated with the alternative content.

SUMMARY OF THE CLAIMED INVENTION

A method for providing video thumbnails is presently claimed. The method includes displaying a first user view of video content at the user device where the video content is provided from a first source. When user input is received at the user device requesting additional information from a second source to be displayed, such as an electronic program guide, a user interface is generated. The user interface includes a designated area for the display of the video content that a user can view while the user is interacting with the additional information. The video content is formatted to be displayed within the designated area. Finally, the user interface is displayed for the user to view such that the user is able to interact with the additional information while simultaneously viewing the video content within the designated area. When the user interface is exited, the user can resume viewing the first user view of the video content.

A non-transitory computer-readable storage medium is also presently claimed. The storage medium has a program that is executable by a process to perform a method for providing video thumbnails. The method includes displaying a first user view of video content at the user device where the video content is provided from a first source. When user input is received at the user device requesting additional information from a second source to be displayed, such as an electronic program guide, a user interface is generated. The user interface includes a designated area for the display of the video content that a user can view while the user is interacting with the additional information. The video content is formatted to be displayed within the designated area. Finally, the user interface is displayed for the user to view such that the user is able to interact with the additional information while simultaneously viewing the video content within the designated area. When the user interface is exited, the user can resume viewing the first user view of the video content.

BRIEF DESCRIPTION OF THE DRAWINGS

FIG. 1A and FIG. 1B illustrate user displays according to a first prior art method.

DETAILED DESCRIPTION

The present disclosure describes implementations of a video thumbnail in an electronic program guide that facilitates user viewing of both electronic program guide and the video content on a display associated with a user device. In particular, the video thumbnail would display the video content that was currently playing when the user requests access to the electronic program guide. The video thumbnail may be situated in a particular portion of the display with respect to the electronic program guide such that the information within the electronic program guide is not obscured. Furthermore, additional information (e.g. metadata) associated with the video content displayed in the video thumbnail can be provided that provides information to the user about what is currently being displayed in the video thumbnail. Lastly, the user is able to perform actions with the electronic program guide without losing the video thumbnail so that the user is able to constantly view the video content while the electronic program guide is displayed.

As described herein, the electronic program guide may refer to an organized set of information (e.g. table, list) that provides information about other types of content that the user may be able to view. For example, some video services may include a list of live content currently available for viewing. Other video services may include a list of stored content that can be retrieved and played at the user device upon request by the user. Although the present application (in the associated figures and descriptions) are directed towards the display of the video content simultaneously with the electronic program guide, it should be noted that other embodiments where the user views other content such as user device configuration/setting screens, user profiles, and user device content playlists can also implement the video thumbnail in a similar manner so that the user is able to view these other content alongside the video content currently being played at the user device.

Figure 4:
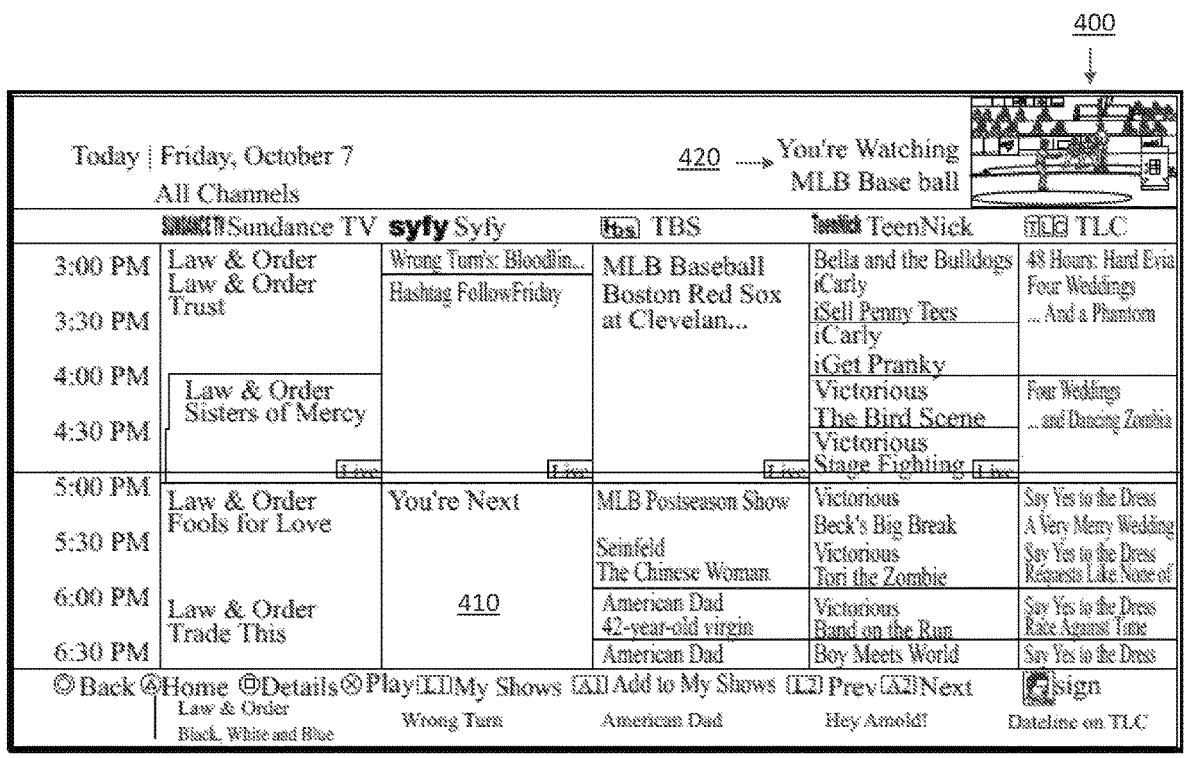
FIG. 4 illustrates an implementation of the video thumbnail during user navigation of an electronic program guide.

FIG. 4 illustrates an implementation of the video thumbnail 400 during user navigation of an electronic program guide 410. The video thumbnail 400 would still be present while the user is performing additional actions (e.g. searches) associated with the electronic program guide 410 that may call additional guides or menus. With reference to FIG. 4, the video thumbnail 400 facilitates user viewing of the video content that was currently being played prior to the retrieval of the electronic program guide 410.

The video content being viewed by the user within the video thumb nail 400 and the information associated with the electronic program guide 410 may be obtained from different content sources. For example, the user may be initially viewing video content (e.g. content on demand, live television, movie) on the display of the user device. The video content, alongside any metadata used to describe the video content (e.g. rating, run time, title) may be provided from one or more respective content sources. For example, the device may be connected to the Internet and thereby is able to request content from third-party sources such as Youtube and Twitch. In other situations, the device may be connected to a network-based service (e.g. Amazon FireTV, Netflix) that stores their own content. The user device would be able to communicate with the network-based service in order to search for and request video content to be provided to the user device for user viewing. In other embodiments, the user device may store content in local memory (e.g. download, record) that the user can also view. Furthermore, live content may also be provided for user viewing on the device from its respective source.

In contrast, when user input is detected regarding the electronic program guide 410, the user device can request and retrieve the electronic program guide from different sources that has the electronic program guide information. Some sources for the electronic program guide information may contain information compiled from other sources beforehand. For example, a third party source may have already queried and compiled content schedules for the upcoming week for a predetermined set of content sources beforehand. In some other situations, the user input may request such information directly from the respective content sources.

Figure 1A:
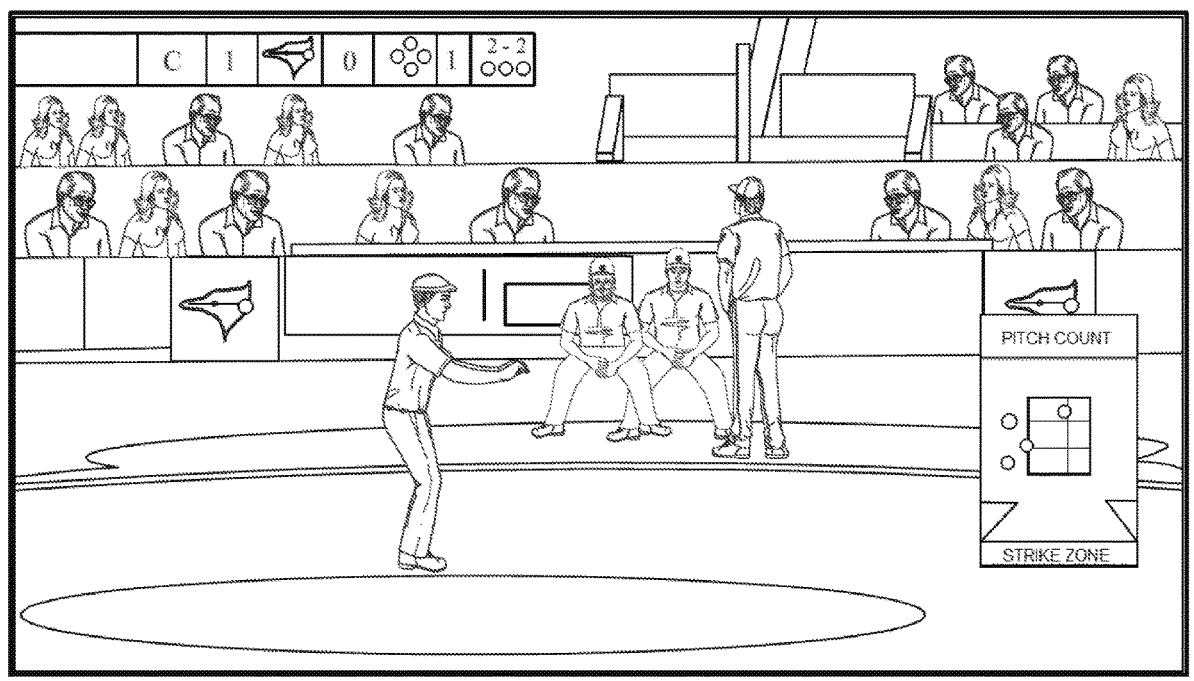
Figure 2:
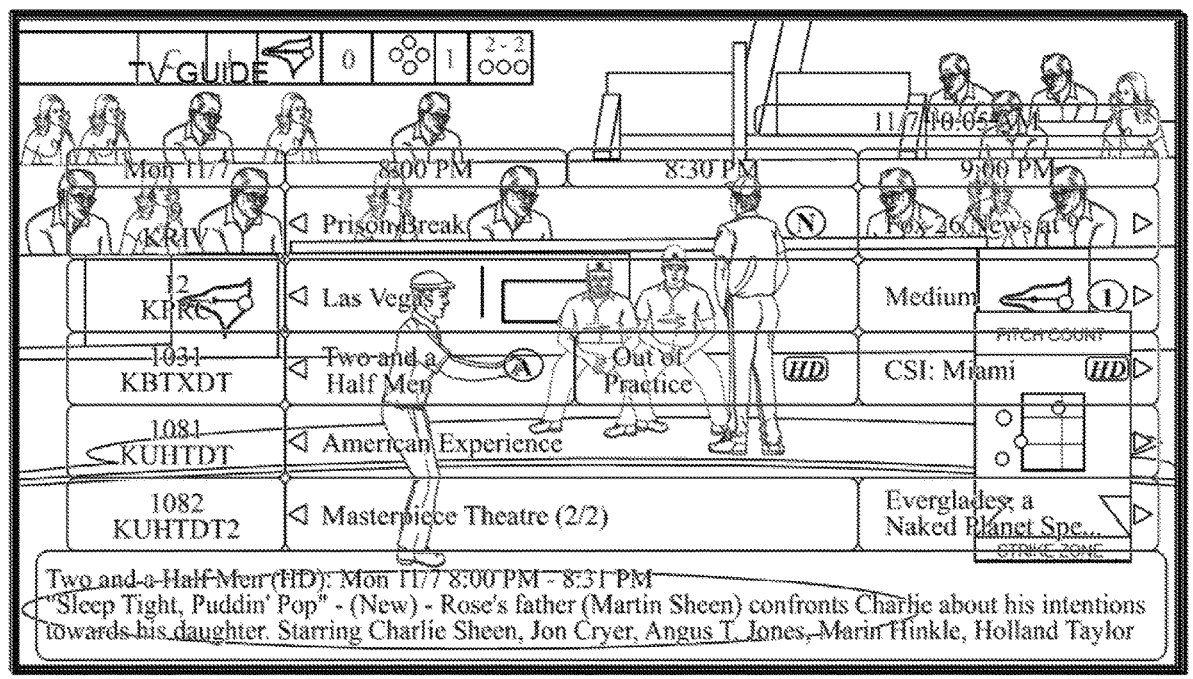
FIG. 2 illustrate a user display according to a second prior art method.
Figure 3A:
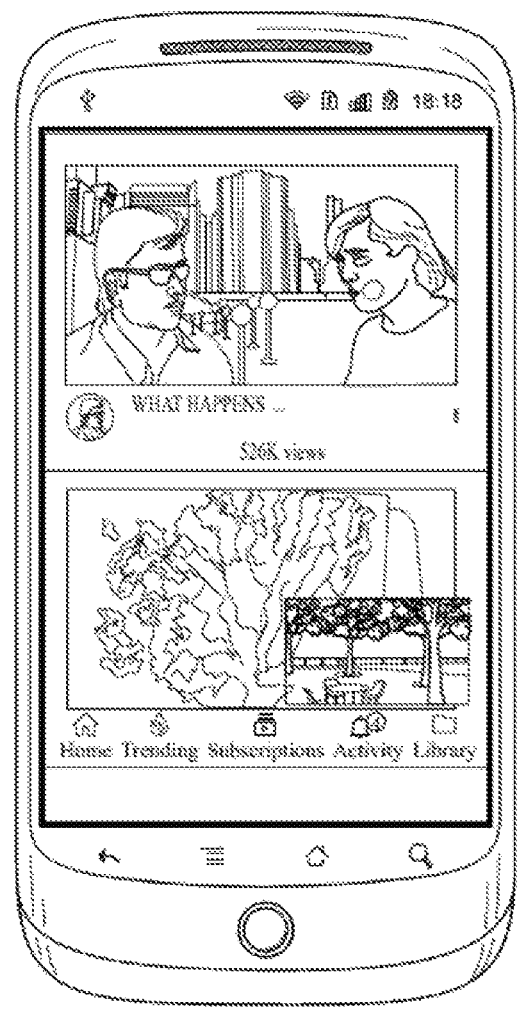
FIG. 3A and FIG. 3B illustrate user displays according to a third prior art method.
Figure 3B:

Compared to the situation in the prior art where the electronic program guide would be displayed over the video content (see FIG. 1B), the present application provides an embodiment that allows the user to view both the electronic program guide 410 and the video content within the video thumbnail 400. In particular, the present application would generate a corresponding user interface that incorporates and organizes the information from the different sources so that the electronic program guide 410 and the video content (via the video thumbnail 400) can be viewed by the user while the user is navigating through the electronic program guide.

With reference to FIG. 4, the figure illustrates use of the video thumbnail 400 when the electronic program guide 410 is currently being viewed and navigated by the user. The user interface associated with the video thumbnail 400 and the electronic program guide 410 is generated in such a manner that provides a pre-determined space for the video content to be streamed from and displayed for the user to view while the electronic program guide 400 is being viewed and/or navigated.

As noted above, example electronic program guides 410 can include information regarding alternative content that may be available for user viewing or scheduling for future content. Furthermore details about the alternative content (e.g. synopsis, rating, run-time) can also be provided via the electronic program guide.

Even with the electronic program guide being active, the user would still be able to view both the video content (via the video thumbnail 400) as well as the electronic program guide 410 simultaneously as illustrated in the figure. Although an embodiment shows that the video thumbnail 400 is currently provided in a pre-determined location of the display (e.g. the upper right hand corner), it should be noted that other arrangements (e.g. location, size) of the video thumbnail 400 would also be possible.

In any case, the arrangement of the video thumbnail 400 with respect to the electronic program guide 410 does not obscure or overlap with information from the electronic program guide 410. Furthermore, the user interface may also provide a pre-determined location where additional description 420 of what is currently being played in the video thumbnail 400. The additional description 420 would be extracted from metadata associated with the video content provided from its content source. Details regarding the location and display of the additional description 420 can be customized by the user. Furthermore, the types of additional description 420 (e.g. title, run time) can also be specified by the user.

As the user navigates through the electronic program guide 410, the video thumbnail 400 will continuously provide the video content for the user to view in the same position. The additional description 420 can also be provided simultaneously.

As noted above, other embodiments may establish the location and/or size of the video thumbnail 400 based on requirements for the user device and/or information displayed on the user device. For example, based on the layout of the electronic program guide 410, the video thumbnail 400 may be moved or resized differently from what is displayed in the figure. Furthermore, there may be situations where the video thumbnail 400 can be customized based on another type of guide or menu that is currently being implemented and viewed while video content is currently playing on the user device. For example, when a user profile menu is requested and displayed on the user device, the user interface generated to be used with the user profile menu may include the video thumbnail 400 that takes a larger portion of the display screen (e.g. half of the display) while the user profile menu takes the other half of the display.

Compared to the prior art, continued use of the video thumbnail 400 is implemented even when the user performs additional actions associated with the electronic program guide 410 that may pull up alternative menus or guides. When new menus or guides are requested, the video thumbnail may still be provided within the pre-defined area initially established in the user interface such that the electronic program guide 410 and any subsequent menus or displays still utilize the same video thumbnail 400. Each menu or guide may also have their own arrangement with where or how the video thumbnail 400 is situated on the display. In any case, the user would still be able to navigate through these different menus and continue viewing the video content via the video thumbnail 400.

Figure 5:
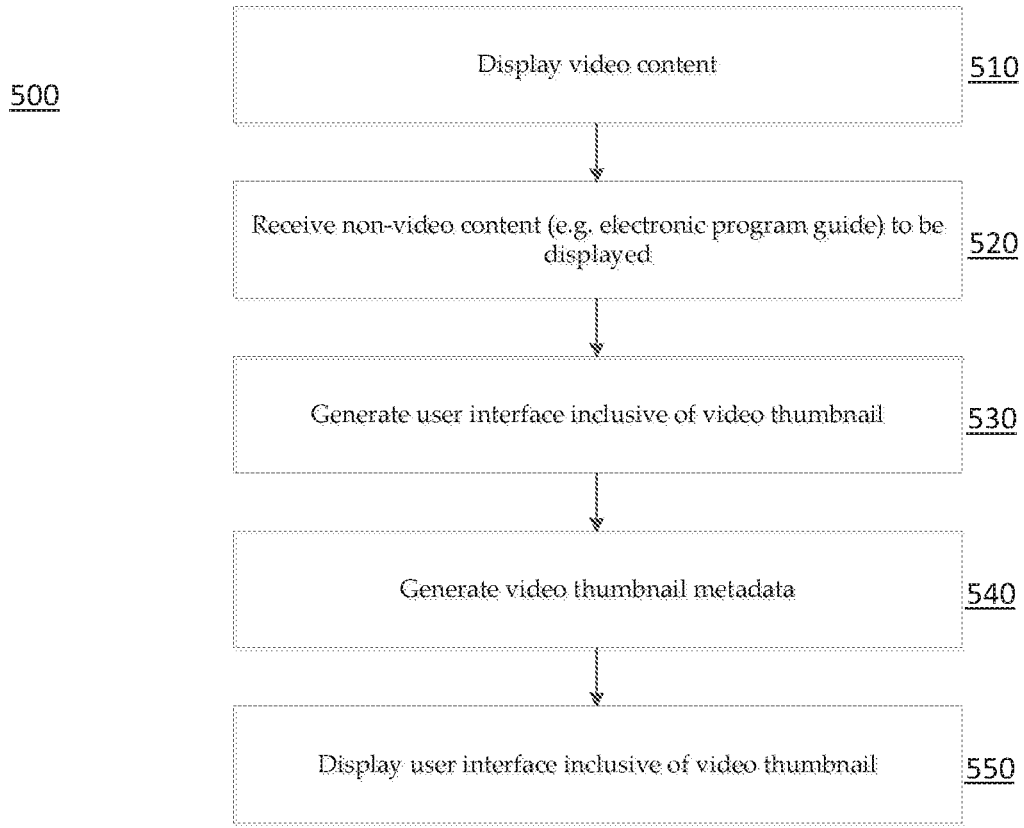
FIG. 5 illustrates a method for implementing the display of FIG. 4.

FIG. 5 illustrates a method 500 for implementing the display of FIG. 4. In particular, the display includes the user interface whereby the video thumbnail is provided for the video content that was currently being viewed by the user prior to display of the electronic program guide. The video thumbnail is situated with respect to the electronic program guide so that the user is able to navigate and perform actions with the electronic program guide while simultaneously viewing the video content in the video thumbnail. Furthermore, any alternative menus or windows (e.g. search menus) that are requested via the electronic program guide or other actions associated with the user device such as entering system menus or user profiles can also be viewed with the video thumbnail providing the current video content for uninterrupted user viewing.

In Step 510, the user device may currently be displaying video content for the user to view on the user device. The video content may be provided from one or more content sources. As noted above, the content sources may include third party content sources. The video content is provided from the content sources and includes metadata that can be used to display information about the video content (e.g. run-time, title, rating, synopsis). The video content may also include information, such as formatting requirements, that could be helpful for the user device to render the video content in a manner that can be viewed properly on the user device.

In Step 520, the user device may receive user input requesting viewing of the electronic program guide. The electronic program guide information would provide the user with information, such as additional live content that the user can view as well as when the live content is available. The electronic program guide information may also provide what content on demand is currently available from the content source that can be viewed on the user device.

The electronic program guide information may be compiled at a content source from other content sources. When the user requests the electronic program guide, the information received may already be in a format that can be displayed on the user device. In other embodiments, an application associated with the user device may request content information from various content sources and process such information to generate the electronic program guide for display on the user device. In any case, the user device will receive electronic program guide information that is set to be displayed on the user device despite having a current video content being displayed on the user device.

In Step 530, the user device processes both the video content from the content source and the information to be displayed (e.g. electronic program guide) responsive to the user input so as to generate a user interface that is capable of displaying both sets of information. The generated user interface would proportion part of the display to be associated with the electronic program while the remaining portion would be associated with the video content. Both these parts would each allow the user to view content associated within that space without interference or obstruction from the other part.

In an embodiment, the user interface (e.g. FIG. 4) would include a pre-determined area referred to as the video thumbnail that allows the video content from the content source to be displayed alongside the electronic program guide. While the electronic program guide is active, the video content from the content source can be formatted to fit within the constraints of the video thumbnail. When the electronic program guide is no longer needed, the video content from the content source can be reformatted to fit the entire display of the user device. However, depending on how frequently the user switches between watching the video content and various guides, menus, application, this may result in a constant need to reformat the video stream into different formats.

In another embodiment, while the electronic program guide is active, the video content from the content source that was initially formatted for the entire display of the user device can remain available for display (at least in the background). Instead of reformatting the content video from the content source, while the electronic program guide is available, the background video content can instead be sampled at regular intervals and the sampled images are replicated (at least in a re-formatted manner) for display within the dimensions of the video thumbnail so as to produce a similar video content stream that would have come from the content source. In this way the user device would not need to constantly reformat the content streams between different sizes. Rather, when necessary, the current video stream from the content source can just be reformatted for the period of time when the guide is needed.

It should be noted that the video thumbnail size can be customized, for example, by the user. Furthermore, third parties associated with the various electronic program guides can also establish user interface templates or parameters that dictate where the video thumbnail can be located and what dimensions the video thumbnail may have.

Also, other menus, windows, and applications can also be requested to be viewed on the user device. Although information about these menus, windows, and applications may be native to the user device, the same situation arises where such menus, windows, and applications would be set to be displayed on the user device at the same time a current video content is being displayed. The present invention could utilize the video thumbnail so that viewing of the video content is not interfered with while the user interacts with the user device via the menus, windows, and applications.

Step 540 includes generating descriptions associated with the video content being displayed in the video thumbnail. The description can be extracted from metadata associated with the video content from the content source. These descriptions would allow the user to constantly be informed as to what is being viewed in the video thumbnail.

Step 550 includes displaying the generated interface with the video thumbnail for the user. The user is then able, as described in the present application, to view the video content while navigating alternative content (e.g. electronic program guide) simultaneously.

In situations where the content (e.g. electronic program guide) is capable of executing additional content (e.g. menus, windows) to be displayed, the user device would be able to further generate additional user interfaces that incorporate the additional content with the video thumbnail in a similar manner. The video thumbnail may remain in the same position and size and the remaining display area can be modified to accommodate the additional content so that the video content is not obstructed by the additional content and vice versa. In other embodiments, the video thumbnail location and/or size can be modified in order to better accommodate the additional content. The modifications, however, may have some pre-determined locations and/or sizes (e.g. maximum or minimum dimensions) that may be used.

Figure 6:
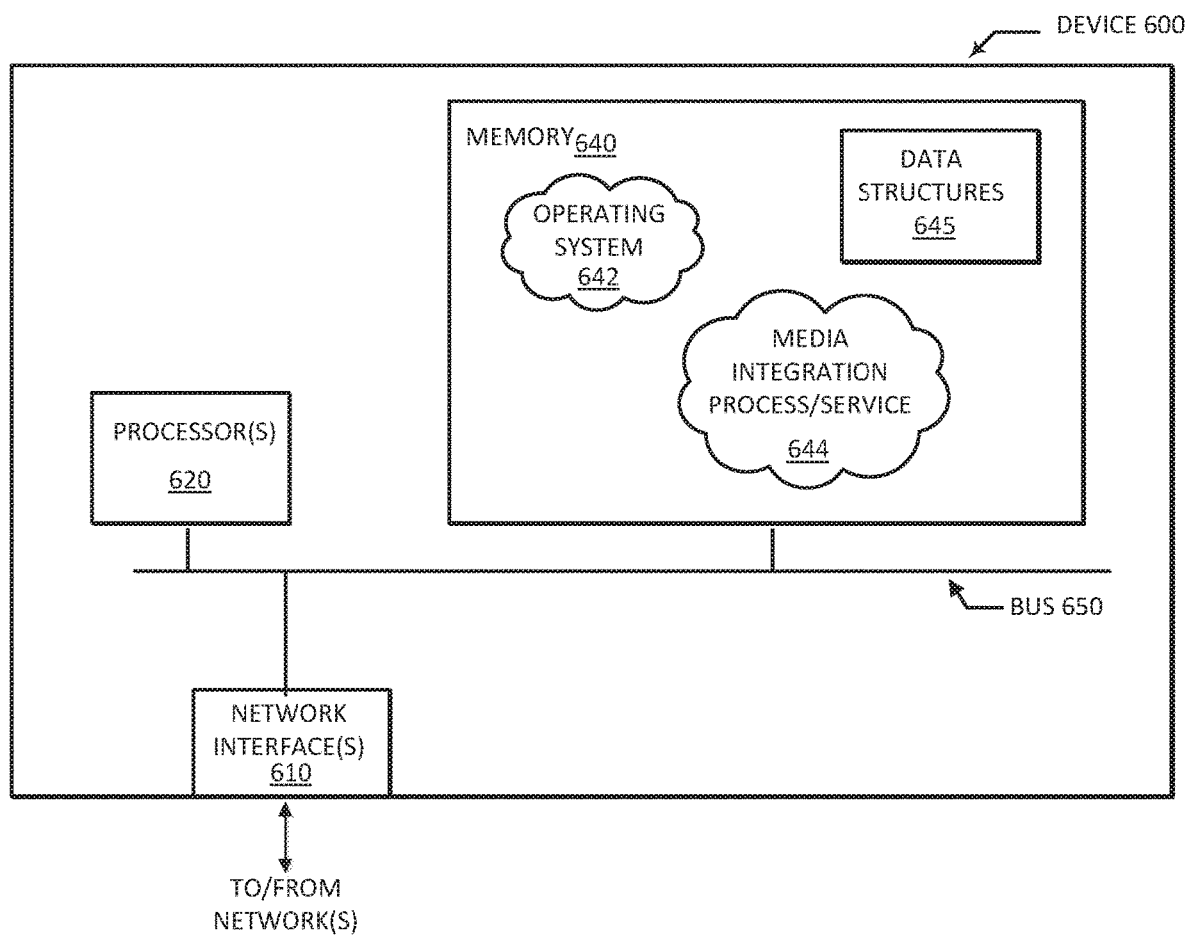
FIG. 6 illustrates a block diagram of an example user device.

FIG. 6 illustrates a block diagram of an example user device 600. The exemplary user device 600 (e.g., desktop, laptop, tablet, mobile device, console gaming system) is a device that the user can utilize to facilitate carrying out features of the present invention. As shown, device 600 includes one or more network interfaces 610 (e.g., transceivers, antennae, etc.), at least one processor 620, and a memory 640 interconnected by a system bus 650.

Network interface(s) 610 contain the mechanical, electrical, and signaling circuitry for communicating data over links coupled to one or more networks. Network interfaces 610 are configured to transmit and/or receive data using a variety of different communication protocols, as will be understood by those skilled in the art.

Memory 640 comprises a plurality of storage locations that are addressable by processor 620 for storing software programs and data structures associated with the embodiments described herein. For example, memory 640 can include a tangible (non-transitory) computer-readable medium, as is appreciated by those skilled in the art.

Processor 620 may comprise necessary components, elements, or logic adapted to execute the software programs and manipulate data structures 645, which are stored in memory 640. An operating system 642, portions of which are typically resident in memory 640, and is executed by processor 620 to functionally organize the device by invoking operations in support of software processes and/or services executing on the device. These software processes and/or services may comprise an illustrative "media integration" process/service 644. Note that while process/service 644 is shown in centralized memory 640, the process/service may be configured to operate in a distributed communication network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 620 can include one or more programmable processors, e.g., microprocessors or microcontrollers, or fixed-logic processors. In the case of a programmable processor, any associated memory, e.g., memory 640, may be any type of tangible processor readable memory, e.g., random access, read-only, etc., that is encoded with or stores instructions that can implement program modules, e.g., a module having spectator channel process 644 encoded thereon. Processor 620 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for providing video thumbnails, the method comprising:

displaying a first view of a video content stream currently being played on a screen of a mobile device, the video content stream provided to the mobile device from a first streaming content source, wherein the first view is displayed according to a first set of dimensions within the screen of the mobile device;

receiving a request for additional information regarding streaming content available from a plurality of different third-party streaming content sources to be displayed at the mobile device;

receiving the additional information from the plurality of different third-party streaming content sources at the mobile device, wherein the additional information from the plurality of different third-party streaming content sources includes electronic program guide information directly associated with each of the different third-party streaming content sources;

compiling the additional information from the plurality of the different third-party streaming content sources to generate a user interface to display the additional information compiled from each of the different third-party streaming content sources, the user interface including a designated area that remains unobscured during user interactions with the additional information in the user interface, and wherein the designated area is customized based on the additional information and has a different set of dimensions than the first of set of dimensions within the screen of the mobile device;

generating a second view of the video content stream by sampling the video content stream currently being played and formatting at least a part of the sample for display within the customized designated area; and displaying the generated user interface on the mobile device, wherein user interaction with the generated user interface is allowed concurrent with the display of the second view of the video content stream within the customized designated area, wherein the user interaction includes navigating to different displays within the generated user interface, and wherein the display of the first view of the video content stream within the first set of dimensions resumes when the generated user interface is exited.

2. The method of claim 1, further comprising extracting part of the additional information from metadata associated with the video content stream.

3. The method of claim 1, wherein sampling the video content stream comprises sampling one or more images from the first view of the video content stream at regular intervals in time, and wherein formatting the part of the sample comprises replicating the sampled images in a different format corresponding to the different set of dimensions of the customized designated area.

4. The method of claim 1, wherein the additional information from at least one of the different third-party streaming content sources includes one or more menus, windows, or applications, and further comprising storing the additional information locally on the mobile device.

5. The method of claim 1, wherein the first set of dimensions of the first view corresponds to a full screen display of the video content stream on the screen of the mobile device.

6. The method of claim 1, wherein the second set of dimensions of the customized designated area includes pre-determined dimensions.

7. The method of claim 1, wherein the customized designated area is located at a pre-determined location in relation to the additional information.

8. The method of claim 1, wherein generating the user interface comprises compiling the additional information from each of the different third-party streaming content sources for display within the customized area.

9. The method of claim 1, further comprising querying the plurality of different third-party streaming content sources based on the request for the additional information.

10. The method of claim 9, wherein the plurality of different third-party streaming content sources are part of a predetermined set.

11. The method of claim 9, wherein the plurality of different third-party streaming content sources are queried in accordance with a schedule.

12. The method of claim 1, wherein the user interaction includes navigation within the additional streaming content from the different third-party streaming content sources, and wherein the second view of the video content stream remains on display during the navigation.

13. A non-transitory computer-readable storage medium having embodied thereon a program, the program being executable by a processor to perform a method for providing video thumbnails, the method comprising:

displaying a first view of a video content stream currently being played on a screen of a mobile device, the video content stream provided to the mobile device from a first streaming content source, wherein the first view is displayed according to a first set of dimensions within the screen of the mobile device;

receiving a request for additional information regarding streaming content available from a plurality of different third-party streaming content sources to be displayed at the mobile device;

receiving the additional information from the plurality of different third-party streaming content sources at the mobile device, wherein the additional information from the plurality of different third-party streaming content sources includes electronic program guide information directly associated with each of the different third-party streaming content sources;

compiling the additional information from the plurality of the different third-party streaming content sources to generate a user interface to display the additional information compiled from each of the different third-party streaming content sources, the user interface including a designated area that remains unobscured during user interactions with the additional information in the user interface, and wherein the designated area is customized based on the additional information and has a different set of dimensions than the first of set of dimensions within the screen of the mobile device;

generating a second view of the video content stream by sampling the video content stream currently being played and formatting at least a part of the sample for display within the customized designated area; and displaying the generated user interface on the mobile device, wherein user interaction with the generated user interface is allowed concurrent with the display of the second view of the video content stream within the customized designated area, wherein the user interaction includes navigating to different displays within the generated user interface, and wherein the display of the first view of the video content stream within the first set of dimensions resumes when the generated user interface is exited.

14. The non-transitory computer-readable storage medium of claim 13, further comprising instructions executable to extract part of the additional information from metadata associated with the video content stream.

15. The non-transitory computer-readable storage medium of claim 13, wherein sampling the video content stream comprises sampling one or more images from the first view of the video content stream at regular intervals in time, and wherein formatting the part of the sample comprises replicating the sampled images in a different format corresponding to the different set of dimensions of the customized designated area.

16. The non-transitory computer-readable storage medium of claim 13, wherein the additional information from at least one of the different third-party streaming content sources includes one or more menus, windows, or applications, and further comprising storing the additional information locally on the mobile device.

17. The non-transitory computer-readable storage medium of claim 13, wherein the first set of dimensions of the first view corresponds to a full screen display of the video content stream on the screen of the mobile device.

18. The non-transitory computer-readable storage medium of claim 13, wherein the second set of dimensions of the customized designated area includes pre-determined dimensions.

19. The non-transitory computer-readable storage medium of claim 13, wherein the customized designated area is located at a pre-determined location in relation to the additional information.

20. A device for providing video thumbnails, the device comprising:
- a screen that displays a first view of a video content stream provided from a first streaming content source and currently being played, wherein the first view is displayed according to a first set of dimensions within the screen;
- an input interface that receives a request for additional information regarding streaming content available from a plurality of different third-party streaming content sources to be displayed;
- a network interface that receives the additional information from the plurality of different third-party streaming content sources, wherein the additional information from the plurality of different third-party streaming content sources includes electronic program guide information directly associated with each of the different third-party streaming content sources; and
- a processor that executes instructions stored in memory, wherein execution of the instructions by the processor:
  - compiles the additional information from the plurality of the different third-party streaming content sources to generate a user interface to display the additional information compiled from each of the different third-party streaming content sources, the user interface including a designated area that remains unobscured during user interactions with the additional information in the user interface, and wherein the designated area is customized based on the additional information and has a different set of dimensions than the first of set of dimensions within the screen of a mobile device;
  - generates a second view of the video content stream by sampling the video content stream currently being played and formatting at least a part of the sample for display within the customized designated area; and
- wherein the screen displays the generated user interface on the mobile device, wherein user interaction with the generated user interface is allowed concurrent with the display of the second view of the video content stream within the customized designated area, wherein the user interaction includes navigating to different displays within the generated user interface, and wherein the display of the first view of the video content stream within the first set of dimensions resumes when the generated user interface is exited.

* * * * *